United States Patent [19]

Kronberg

[11] Patent Number: 5,315,884
[45] Date of Patent: May 31, 1994

[54] CAPACITIVE PROXIMITY SENSOR

[75] Inventor: James W. Kronberg, Aiken, S.C.

[73] Assignee: The United States of America as represented by the United States Department of Energy, Washington, D.C.

[21] Appl. No.: 756,669

[22] Filed: Sep. 9, 1991

Related U.S. Application Data

[63] Continuation-in-part of Ser. No. 461,962, Jan. 8, 1990, Pat. No. 5,046,371.

[51] Int. Cl.$^5$ .................................................. G01L 1/16
[52] U.S. Cl. .................................. 73/862.68; 324/671
[58] Field of Search ...................... 73/862.626, 862.68, 73/718, 724; 29/25.25; 361/283; 324/658, 671, 674, 675, 681, 661, 662, 690, 677, 678; 340/562, 563

[56] References Cited

U.S. PATENT DOCUMENTS

| 3,829,850 | 8/1974 | Guetersloh | 340/563 |
| 3,896,425 | 7/1975 | Erichsen | 340/563 |
| 3,944,792 | 3/1976 | Sautner | 324/662 |
| 4,016,490 | 4/1977 | Weckenmann et al. | 324/671 |
| 4,071,820 | 1/1978 | Mushinsky | 324/671 |
| 4,122,708 | 10/1978 | Maier | 73/862.326 |
| 4,339,709 | 7/1982 | Brihier | 324/681 X |
| 4,387,601 | 6/1983 | Azegami | 324/662 X |
| 4,451,780 | 5/1984 | Ogasawara | 324/671 |
| 4,476,430 | 10/1984 | Wright et al. | 324/671 |
| 4,572,006 | 2/1986 | Wolfendale | 73/862.626 |
| 4,794,321 | 12/1988 | Dotsko | 324/661 |
| 5,025,223 | 6/1991 | Smith, Jr. et al. | 324/671 X |
| 5,148,126 | 9/1992 | Spencer | 324/681 X |

FOREIGN PATENT DOCUMENTS 0421394 4/1991 European Pat. Off. .
2269932 11/1990 Japan .

Primary Examiner—Richard E. Chilcot, Jr.
Assistant Examiner—Elizabeth L. Dougherty
Attorney, Agent, or Firm—Brian R. Tumm; Harold M. Dixon; William R. Moser

[57] ABSTRACT

A proximity sensor based on a closed field circuit. The circuit comprises a ring oscillator using a symmetrical array of plates that creates an oscillating displacement current. The displacement current varies as a function of the proximity of objects to the plate array. Preferably the plates are in the form of a group of three pair of symmetric plates having a common center, arranged in a hexagonal pattern with opposing plates linked as a pair. The sensor produces logic level pulses suitable for interfacing with a computer or process controller. The proximity sensor can be incorporated into a load cell, a differential pressure gauge, or a device for measuring the consistency of a characteristic of a material where a variation in the consistency causes the dielectric constant of the material to change.

14 Claims, 3 Drawing Sheets

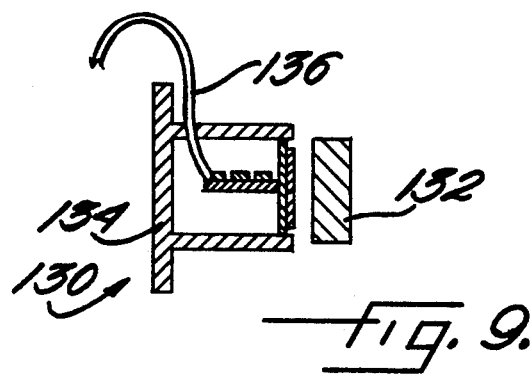
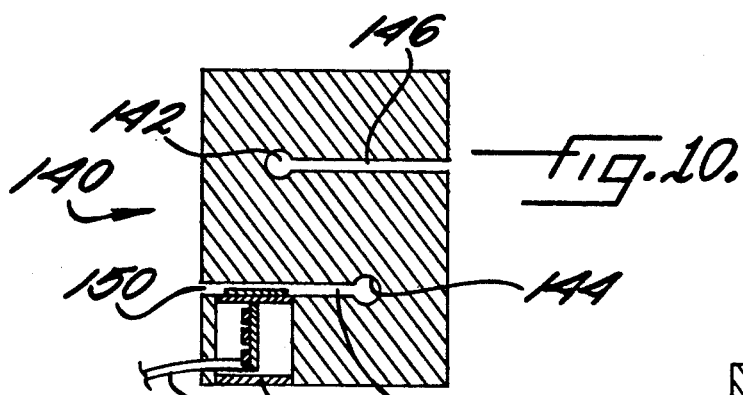
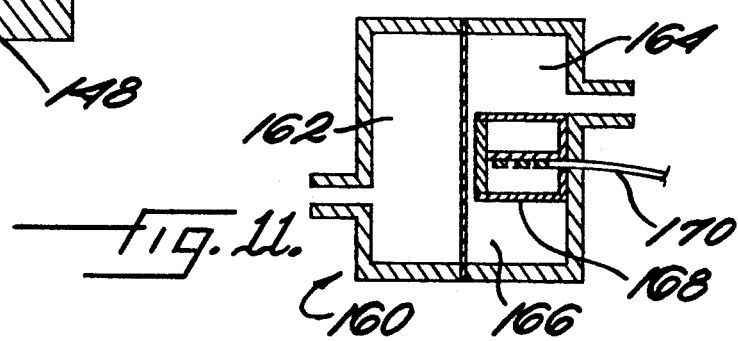
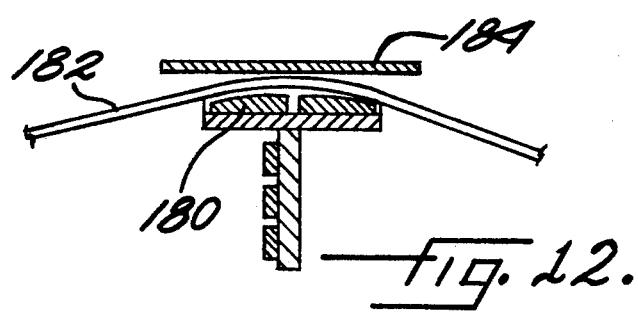

CAPACITIVE PROXIMITY SENSOR

The United States Government has rights in this invention pursuant to Contract No. DE-AC09-89SR18035 between the U.S. Department of Energy and Westinghouse Savannah River Company.

This application is a continuation-in-part of copending application entitled "Rotating Capacitative Torque Sensor", Ser. No. 461,962, filed Jan. 8, 1990, U.S. Pat. No. 5,046,371.

BACKGROUND OF THE INVENTION

1. Field of the Invention

The present invention relates to proximity sensors. More particularly, the present invention relates to "closed field", capacitive proximity sensors for measuring force, displacement and pressure.

2. Discussion of Background

Many techniques currently exist for detecting the presence of solid objects or liquids in specified locations, for measuring small displacements or forces acting upon them, and for measuring absolute or differential pressures in gases or liquids. For compatibility with modern display and control devices, nearly all transducers now manufactured to sense these quantities are electronic or electrical in nature.

The majority of force transducers employ strain gauges: arrays of matched resistors, typically made of metallic foil, and so configured that mechanical strain causes the resistance of certain of these resistors to increase relative to that of others. Typically, a strain gauge is attached to a solid body of elastic material, such as steel, which bends or otherwise deforms in response to the applied force, so that strain in the support is transferred to the gauge and produces the electrical output.

Similarly, gas pressure and mechanical displacement may be measured by means of thinner, elastic elements, such as diaphragms, to which strain gauges are attached. Flexing in response to gas pressure, or to a change in mechanical shape resulting from relative movement between objects bridged by the elastic element, transfers strain to the gauge and produces the output.

Strain gauges have represented the technology of choice for many years, since they are easily made, usually inexpensive, and give outputs which are approximately linear with respect to the amount of strain which is present. However, the output of such a device is typically a very small fraction of the applied driving voltage, is very sensitive to driving-voltage fluctuations, and appears at a fairly high impedance of several hundred to a few thousand ohms; these disadvantages make strain gauges difficult to use in remote or electrically-noisy locations.

Several other sensing methods also exist, and are widely used in detecting the presence of objects or, in some cases, in measuring mechanical displacement. Typically, a steady or fluctuating electromagnetic field is set up and its interaction with the immediate environment, including nearby materials, is observed. While most methods are limited to sensing materials with high electrical conductivity, magnetic permeability or optical reflectance, electric fields at moderate to high frequencies can be used to sense a wide variety of materials through the changes in the magnitude of displacement current flowing into or out of the sensing field, resulting from varying capacitance. Such a sensing field is usually projected by a flat metal plate which faces the object or location to be sensed. For instance, an array of small metal-plated areas on the back of a sheet of glass, and connected to appropriate circuitry, is often used as a convenient, long-lasting and easily-cleaned control panel for a microwave oven or other kitchen appliance.

Typically, capacitive sensing uses an "open" sensing field: one which provides no inherent return path for the displacement current flowing between the sensing field and the object to be detected. For proper functioning, therefore, an adequate return path must be provided by electrically-conductive materials or distributed capacitance in the environment. Operation is thus quite dependent on factors over which the user may have little or no control. High levels of electrical or magnetic noise may also enter the open sensing field from the environment, causing interference and "false positive" readings.

Were it not for the weakness resulting from the open nature of the sensing field, capacitive proximity sensing would be readily adaptable to the vast majority of position, proximity, strain, displacement and pressure sensing applications.

SUMMARY OF THE INVENTION

According to its major aspects and broadly stated, the invention is a capacitive proximity sensor which creates a "closed" detection field in which current circulates among two or more (preferably three) sets of plates and requires no external return path, making operation much more reliable and less dependent on outside factors, and whose output is a variable-frequency, logic-level pulse train which is easily interfaced with a computer or process-control device.

Sensors of this type could be used in many ways. For instance, the presence of nearby, electrically-conductive objects or those of high dielectric constant (such as any material holding a significant content of water), without the need for any physical contact, could be sensed easily. If the electrical characteristics of such an object were known, accurate measurement of its distance from the plates could be made. Similarly, placing such an object at a distance from the plates which could be made to vary by some applied force, such as that exerted by a pressurized gas against a diaphagm or the weight of some object upon a load cell, would permit accurate measurement of that force via the change in the oscillator's output frequency. Examples of such applications are given in the Detailed Description of Preferred Embodiments.

BRIEF DESCRIPTION OF THE DRAWINGS

In the figures,

FIG. 9 is an illustration of the present invention as a simple proximity sensor;

FIG. 10 is an illustration of the present invention as a load cell;

FIG. 11 is an illustration of the present invention as a pressure sensor; and

FIG. 12 is an illustration of the present invention as a material consistency gauge.

DETAILED DESCRIPTION OF A PREFERRED EMBODIMENT

By forming a capacitive sensor with multiple plates, placed side by side or interleaved, and driven by sine or other electric waveforms which differ in phase or amplitude so that the instantaneous sum of applied voltages is constant, it is possible to operate the sensor in a "closed-field" manner in which displacement current flows only in the space between the sensor and the target, eliminating dependence on the environment and vulnerability to electrical noise which it may contain. Such an array can be produced by cutting and assembling metal sheets, by printed-circuit techniques, through vapor deposition, or in a wide variety of other ways.

Figure 1:
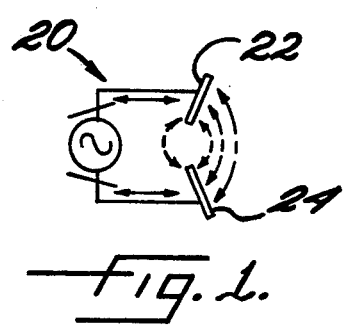
FIG. 1 is a simplified schematic diagram of a closed field proximity sensor according to a preferred embodiment of the present invention.

In the simplest case, shown in FIG. 1, a proximity sensor 20 may be formed using two plates 22, 24 driven by equal and opposite waveforms. With only air or vacuum surrounding the plates, small displacement currents will flow through the space immediately in front of the plates, and also behind them, alternating in direction with each reversal of the waveform polarity. Angling the plates toward each other will tend to concentrate the field in front. Any increase in the dielectric constant or electrical conductivity of the immediate surroundings will cause this current to increase, producing a reading. Changes in the more distant environment, outside the region of displacement-current flow, have little or no effect.

Preferably, a sensor according to the present invention would use a larger number of plates, connected in symmetrical groups surrounding a common center, with each group driven by its own signal. Such a symmetrical arrangement would prevent the array of plates from acting as a dipole antenna, thus both reducing interference from environmental noise and preventing the undesired emission of signals from the sensor itself. Each group might be formed by any convenient number of plates, having virtually any shape and distribution, and any number of groups might also be used.

In general, the plate array preferably has at least one pair of plates formed from metal or other conductive material, most preferably of three pair, and also the plates arranged symmetrically around a common center, and most preferably with the plates approximately equal in area, such as six plates, each an equilateral triangle, and arranged in a hexagon with each pair of plates defined by the diametrically opposing two plates and held in place by a rigid supporting structure.

Figure 2:
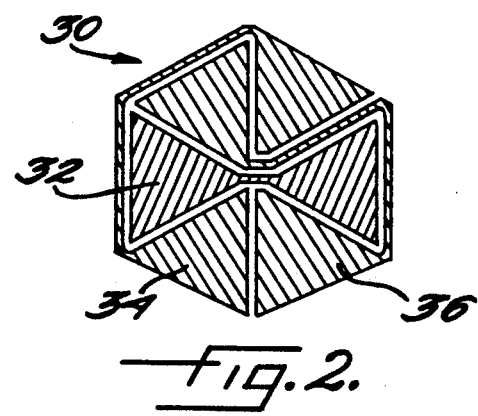
FIG. 2 is an array of plates according to a preferred embodiment of the present invention.

A simple practical example of a plate array 30 is shown in FIG. 2: six triangular plates are arranged in a hexagon, each opposing pair 32, 34, 36 of plates connected together, and each pair driven by one of three signals of equal amplitude but phased 120 degrees apart.

Figure 3:
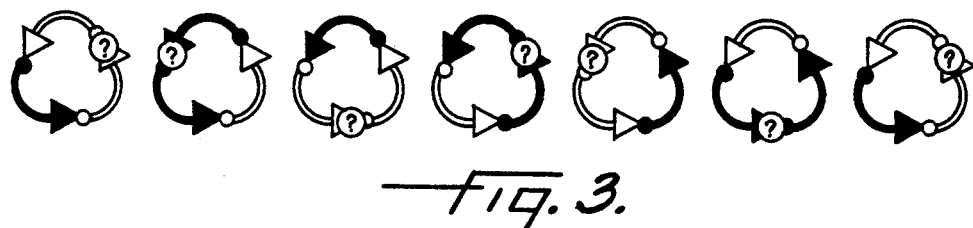
FIG. 3 is an illustration of the movement of a logical discontinuity of a ring oscillator.

A means of generating such signals, particularly well-suited for use in a sensor of this type, is the ring oscillator. Such an oscillator consists of three, five or a larger odd number of inverting logic gates, connected head-to-tail in a continuous ring. Such a ring cannot take on a stable logic configuration, since the signal is inverted an odd number of times and thus a logical discontinuity must exist at some point. As shown by the diagram in FIG. 3, this discontinuity ("?") travels around and around the ring as each gate in turn switches its logical state. Two complete revolutions return the ring to its starting condition; the action, however, continues indefinitely. Note that the apparent signal polarity (indicated by either the black or the white circuit elements) appears to circulate around the ring in the opposite direction from the discontinuity and advancing by one gate with the passage of the discontinuity around the ring.

The time needed for the discontinuity to travel once around the ring is the sum of all the signal propagation delays in its path, both within the gates themselves and in the wiring which connects them. Ring oscillators are often used in testing new logic-gate designs or to verify manufacturing consistency, since it is much easier to measure the propagation time in a ring of many high-speed logic gates (equal to twice the sum of all delays) through the resulting oscillation frequency than it is to measure the switching speed of a single gate.

Figure 4A:
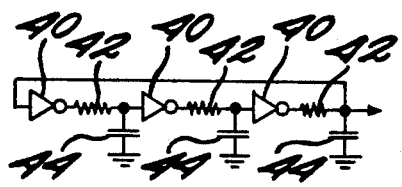
FIGS. 4a, 4b, and 4c illustrate grounded-open, floating-open, and floating closed circuit arrangements.
Figure 4B:
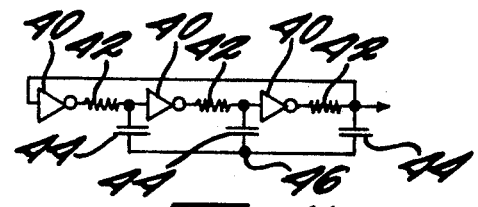

In such a test, the oscillation frequency is typically many megaHertz. If delays are deliberately introduced between inverting gates 40 (FIGS. 4a, 4b and 4c), however, the frequency may drop by several orders of magnitude. For example, series resistors 42 and shunt capacitors 44 may be used to form simple low-pass filters, as shown in FIGS. 4a and 4b. It is interesting to note that oscillation takes place in the same way and with little change in frequency, whether the common node 46 of the capacitors is grounded (FIG. 4a) or floating (FIG. 4b) with respect to the power supply for the gates.

Figure 4C:
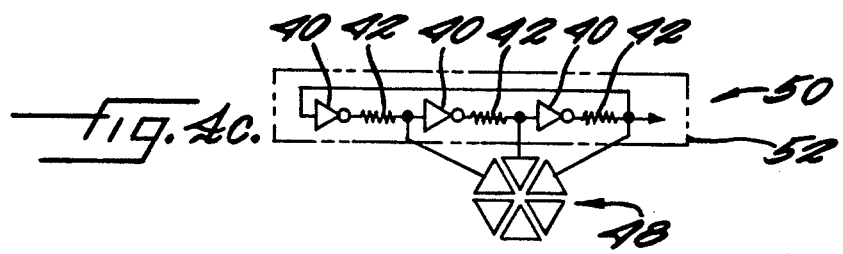

If, as shown in FIG. 4c, the "lumped" capacitors of FIGS. 4a and 4b are replaced with an array 48 of metal plates as described above (FIG. 2) these plates will become surrounded by a field of displacement current, whose magnitude will depend upon the arrangement (or absence) of objects within it and the electrical conductivity or dielectric constant of each. Increasing conductivity or dielectric constant will cause the capacitance to increase, slowing signal propagation around the ring and thus causing a drop in the output frequency. The ring oscillator and the plates together thus form an inexpensive, very practical version of the "closed-field" capacitive sensor previously described.

If a piece of electrically conductive or high-dielectric-constant material, of known or predictable characteristics—for example, a thin metal foil, electrically floating and oriented approximately parallel to the plates—is deliberately introduced into the field, the change in capacitance will be inversely proportional to its distance from the plates. At spacings large in comparison with the plate size, the capacitance will be small and the oscillation frequency high, with most of the displacement current flowing through the air close to the plates. At smaller spacings, proportionately more of the field will be intercepted and "shorted out" by the foil, increasing the capacitance and lowering the oscillation frequency.

Figure 5:
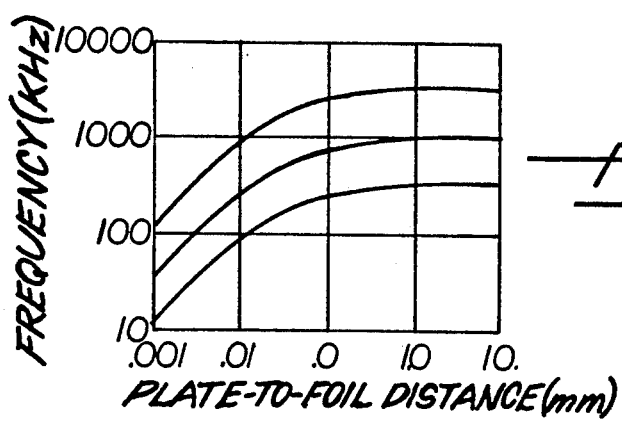
FIG. 5 is a graph showing frequency versus plate-to-foil distance for various resistances between inverting logic gates, illustrating the approximate linearity of the frequency as a function of plate-to-foil distance within the range of the closed field and its insensitivity beyond that range.

Because the relationships between distance and capacitance and between signal propagation time and oscillating frequency are both reciprocal, the output frequency at relatively small spacings will be nearly proportional to the distance between the foil and the plates, and inversely proportional to the plate size and to the value of the series resistance. Proper selection of these latter terms can thus place the frequency in the range desired for convenient measurement, without affecting the linear relationship between it and the foil spacing. Maximum working distance is that at which the mutual capacitance of the plates exceeds the capacitance between plates and foil; objects at greater distances have no effect. Calculated frequency-versus distance curves are shown in FIG. 5 for three different resistor values used with the same plate array 48. Because the capacitances between small plates in air are quite low, on the order of a few picofarads, the generation of sub-megaHertz frequencies (preferred because of simpler wiring, easier trouble-shooting and lower cable attenuation) requires that the series resistances be quite large, on the order of a megohm. As a result, the gates used must have very high input impedances. Low output impedances are desirable, and more consistent results will be obtained if the gate input and output characteristics are roughly symmetrical. The industry-standard, 4000-series CMOS technology meets all of these requirements. In particular, a single 4049-type, hex inverting buffer could form the entire active portion of such a sensor, three of its internal gates forming the ring oscillator and the other three tied in parallel to form an output amplifier capable of driving low-impedance signal line or an external long-haul amplifier.

Since the output from the sensor is already composed of voltages at normal logic levels, it is easy to interface with a computer or process controller without the need for highly stable (and expensive), analog-to-digital conversion circuitry or for sophisticated signal conditioning. A single, digital input line can be used, with a "background" computer routine, possibly interrupt-driven, monitoring it at short intervals to see whether an input pulse has arrived. Depending upon the relative frequencies of the sensor input and the computer clock, it may be preferable to measure either the time between pulses (if long in relation to clock time) or, alternatively, the number of pulses arriving within some standardized period of time. For very high frequency signals, some form of prescaling (i.e., division of the true frequency by some constant) may be desirable, either in the sensor itself or at the computer input.

A basic sensor 50, as shown in FIG. 4c, comprising a circuit module 52 and plate array 48, is used in all of the embodiments described below.

Figure 6:
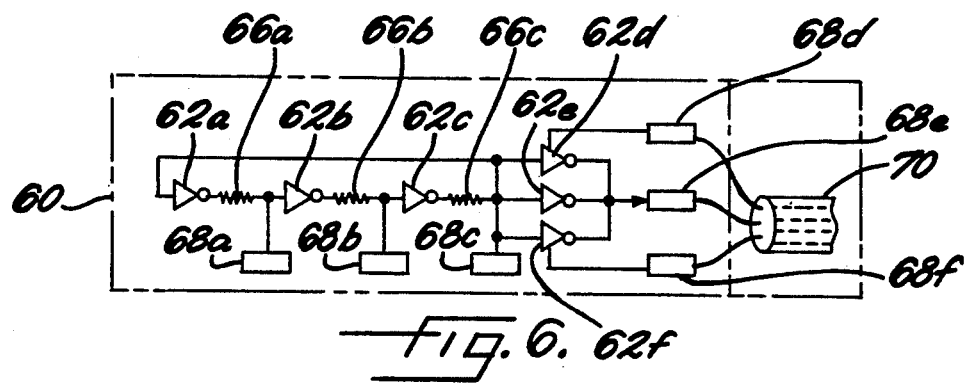
FIG. 6 is a schematic diagram of a module according to a preferred embodiment of the present invention.

Referring now to FIG. 6, module 60 can be formed using a substrate made, for example, of steatite ceramic, bearing a 4049-type silicon chip, preferably in loose-die form, containing six inverting logic gates 62a–62f (FIG. 6) connected in the manner previously described, and covered with epoxy after installation. The substrate also carries three resistors 66a, 66b and 66c, which may be "chip" or other discrete-type resistors or may be formed directly on the substrate by thick- or thin-film processes. Metal or other conductive material is applied to the substrate, forming all needed interconnecting wiring traces, plus three input pads or terminals 68a, 68b and 68c and three output pads 68d, 68e, and 68f for output of the frequency signal and for connection to external power.

Figure 7:
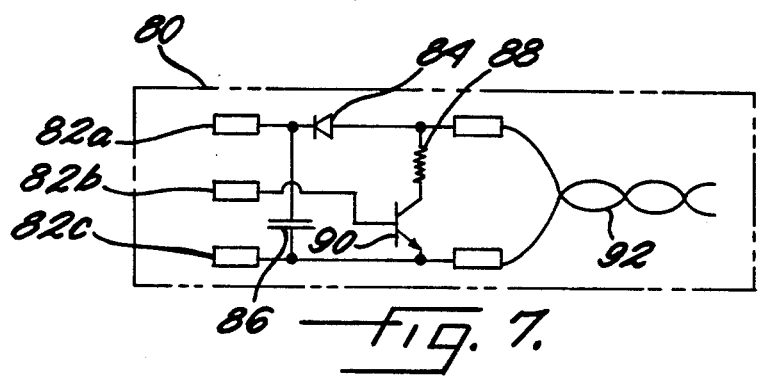
FIG. 7 is a circuit addition for use with the module as shown in FIG. 6 to permit operation of a preferred embodiment of the present invention over longer distances.

These components will suffice for operation at short distances from the computer or other receiving device, where three-wire shielded cable 70, such as microphone cable, may conveniently be run. For noise-free operation over longer distances, a second module 80, having input pads 82a, 82b, and 82c plus the addition of diode 84 (FIG. 7), capacitor 86, resistor 88 and transistor 90, preferably an NPN silicon type such as 2N2222, permit two-wire, current-loop-type operation over a twisted-pair line 92 (as, for instance, in telephone cable) with two current levels substituting for the logic levels. These elements (80–90) are conveniently assembled on module 80, with pads 82a, 82b and 82c so located that they may be soldered directly to pads 68d, 68e and 68f of module 60 for connection to the current loop.

The plates may be formed in any of a wide variety of ways—for instance, by conventional, printed circuit board etching techniques—and then interconnected by jumpers, circuit traces, or otherwise. Module 60 is then preferably mounted just behind the plate-supporting structure and connected to the plates. Connection may be slightly simplified if one pair of plates is joined by a short central trace on the same side of the support.

To minimize capacitance between circuit elements, the support is as thin, and is made of a material having as low a dielectric constant, as is mechanically feasible. For example, circuit board made of glass-fiber-reinforced TEFLON ® might be used. An air space should be left behind it, and module 60 should be mounted perpendicularly to the support, with pads 68a, 68b and 68c adjacent to it, rather than flat against the support.

Figure 8:
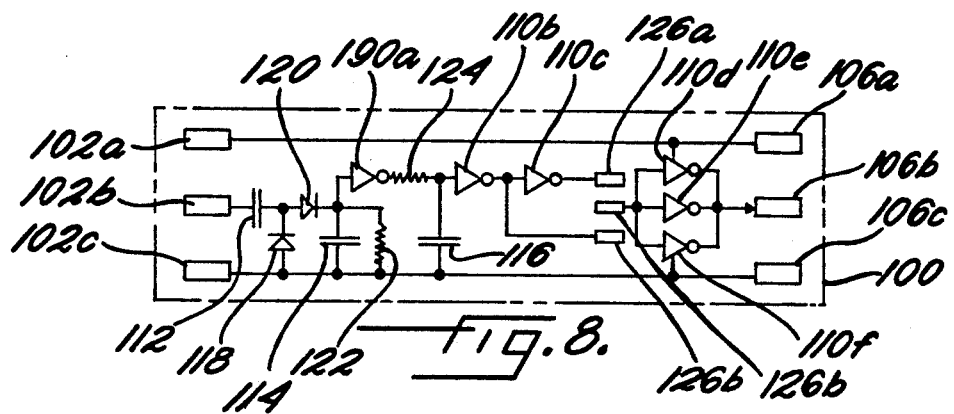
FIG. 8 is an alternative embodiment of the module according to the present invention as an "on-off" device or limit switch.

While such a sensor inherently gives a continuous measurement of distance, in the manner of an analog sensor, it can be made into a simple "on-off" device, like a limit switch (FIG. 8), by adding a charge pump, filter and a voltage comparator. For example, a third electronic module 100 can be formed on a substrate, designed to be attached to pads 68d, 68e and 68f of module 60 by means of pads 102a, 102b and 102c, respectively, on module 104, and having additional pads 106a, 106b, and 106c for attachment to a three-wire cable or to module 80 for two-wire operation.

A silicon chip, 4049-type hex inverter 104, mounted on module 100, consists of six gates 110a, 110b, 110c, 110d, 110e and 110f. Also carried by the module 100 are capacitors 112, 114 and 116, diodes 118 and 120, and resistors 122 and 124. Three additional, small pads 126a, 126b and 126c are provided for function selection.

The frequency output of module 60 is applied through tab 102b and capacitor 112 to diode pair 118 and 120, forming a charge pump which transfers charge to capacitor 114 on each positive transition of the input. Capacitor 114 is preferably at least ten times as large as capacitor 112. Charge is bled off from capacitor 114 through resistor 122, so that the voltage on capacitor 114 will tend to stabilize at a value approximately proportional to the frequency of the input. Component values are selected so that this voltage will be about halfway between the positive supply voltage and ground when the input frequency is about one-half the maximum oscillation frequency of module 60.

Gate 110a monitors the voltage on capacitor 114, acting as a voltage comparator so that with "metal present" (that is, with low frequency input and low voltage on the capacitor) the gate's output is a logic "high", while with "metal absent" the output is a logic "low". Resistor 124, capacitor 116 and gate 110b act to prevent rapid output fluctuation when the voltage on capacitor 144 is close to the critical value. Gate 110c simply inverts gate 110b's output. An external jumper (not shown) placed either between pads 126a and 126b, or between pads 126b and 126c, selects either the output of gate 110b or that of 110c (that is, either a logic "high" or a logic "low" on "metal present") and feeds it to the parallel combination of gates 110d, 110e and 110f, which functions as an output amplifier in the same way as the combination of gates 62d, 62e and 62f in module 62.

Any of the specific embodiments described below may be made equally well as either frequency-output or "on-off" devices, depending upon the desired application.

A simple proximity or displacement sensor 130, able to detect nearby bodies of conductive or high-dielectric material or to measure the distance between itself and some one such body 132 of known characteristics, would consist of nothing more that the basic sensor 50 (FIG. 4c) in a suitable housing 134 and with an attached cable 136. With electronics consisting solely of module 60, the output from sensor 130 would consist of a logic-level pulse train having a maximum frequency in the absence of such a body, and a progressively lower frequency (or a longer time between pulses) as such a body moved toward it. Module 80, module 100, or both, may be attached to module 60 if other output formats are desired. Depending upon the application, body 132 may or may not be supplied with the sensor.

A load cell using the principle of the invention could take any of a variety of forms, depending upon the application and the magnitude of the force to be measured. For example, an "S" form, used in many intermediate-range load cells, is made from a rectangular block of metal 140, having a known elastic modulus, by drilling two holes 142 and 144 and cutting two slots 146 and 148. Force is applied to the two end surfaces of the block, perpendicular to the plane of the slots, and the deflection of the block is determined by measuring the amount by which the slots are narrowed.

To apply the principle of the invention, a chamber 150 is formed in the base of the "S" by drilling or machining, and the basic sensor (FIG. 4c) is installed within it with the plate array facing the opposite surface of slot 148 and in close proximity to it. The sensor cable 152 is led out through a small hole in the side of the chamber, which is then closed with a plug 154. Force applied to the load cell will cause the slot to narrow, changing the capacitance between the plate array and the slot wall, and thus causing a change in the oscillation frequency and producing a measurable output.

Similarly, the principle can be used in making a differential pressure gauge 160. Here, two fluid chambers 162 and 164 are separated by a flexible, elastic diaphragm 166, typically of INCONEL ® or other corrosion-resistant metal. Differences in pressure cause the diaphragm to flex slightly, moving toward the chamber of lower pressure.

Placing the basic sensor of FIG. 4c in one of the chambers—preferably enclosed in a corrosion-resistant, protective housing 168—and with its plates adjacent to and facing diaphragm 166, permits sensitive measurement of the amount of deflection and thus of the differential pressure. A cable 170 conveys the output signal from the interior of the chamber to the outside world. Alternatively, where very high pressures or unusually corrosive conditions are expected, the plate array alone may be mounted inside the chamber and the electronics just outside it.

Yet another application of the invention is in gauging the manufacturing consistency of cloth, paper, plastic film and similar products, in which the distribution of high-dielectric-constant material (such as the water content of paper) should be relatively constant and deviations from an ideal value may be symptoms or predictors of manufacturing problems. Here, the basic sensor is placed with its plate array 180 adjacent to a moving film or sheet 182 of the product under study. Array 180 is preferably made very smooth and slightly convex, and may be covered with a thin anti-stick coating or film such as TEFLON ®, so that the product sheet will conform closely, under tension, to the surfaces of the plates without undue wear. A metal counter-electrode 184 may or may not be used, depending upon the nature and thickness of sheet 182; if used, this electrode may be either grounded or electrically floating. Variations in the output frequency reflect changes in the effective dielectric constant of the material passing the plate array. These may be changes in sheet thickness, in the dielectric constant of the sheet or the distribution of high-dielectric-constant materials within it, or a combination of these factors.

Many further applications, modifications and substitutions with respect to the present invention are possible, as will be evident to those skilled in the art of instrumentation, without departing from the spirit and scope of the invention as defined by the appended claims.

What is claimed is:

1. A device for measuring the proximity of an object, said device comprising:

at least one pair of conducting plates, each of said at least one pair having a first plate and a second plate, said first plate spaced apart and disposed with respect to said second plate so that a displacement current is formed therebetween when an electrical voltage is applied between said first and said second plates, said first and second plates disposed at an angle to concentrate said displacement current;

means for generating a voltage signal for each of said at least one pair of conducting plates, each voltage signal having a phase and an amplitude, said phases and amplitudes selected so that the sum of the instantaneous voltage on said at least one pair of conducting plates is constant, and applying each said voltage signal to a pair of said at least one plates, said at least one pair of plates having an electrical current circulating thereamong when said voltage signals are applied by said generating means, said electrical current circulating at a frequency, said frequency varying with the proximity of said object; and means in electrical communication with said at least one pair of plates for determining said frequency, said generating means further comprising a series of inverting logic gates.

2. The device as recited in claim 1, wherein said voltage signal varies sinusoidally.

3. The device as recited in claim 1, wherein said at least one pair of plates further comprises three pair of plates arranged in a symmetrical group about a common center.

4. The device as recited in claim 1, wherein each inverting logic gate is separated by a resistor.

5. The device as recited in claim 1, wherein said determining means is a process controller.

6. The device as recited in claim 1, wherein said first and said second plates are disposed at an angle less than 180 degrees with respect to one another to concentrate said displacement current.

7. A device for measuring the proximity of an object, said device comprising:
a substrate;
a plurality of inverting logic gates carried by said substrate;
a plurality of resistors carried by said substrate, one resistor between and in electrical connection with two of said plurality of inverting logic gates, said plurality of inverting logic gates and resistors alternating in a series; and
a symmetrical array of plates, said plates having substantially equal area and being arranged around a common center, each of said plates being interconnected to a diametrically opposing plate, each resistor of said plurality of resistors corresponding to and electrically connected to one plate of said array of plates,
said series producing an output when a voltage is applied to said series, said output varying substantially in proportion to the proximity of said object to said array of plates.

8. The device as recited in claim 7, wherein said array of plates comprises an odd number of pairs of plates.

9. The device as recited in claim 8 wherein said odd number of pairs of plate comprises three pairs of plates.

10. The device as recited in claim 7, further comprising amplifier means for driving a signal line, said amplifier receiving said output of said series.

11. The device as recited in claim 7 for use as a load cell against which a force may be applied, said device further comprising a metallic block having a first slot and a second slot, said second slot dimensioned to accommodate said array of plates, said array oriented parallel to the surface of said slot, said first and second slots lying in parallel planes and perpendicular to the direction of said applied force.

12. The device as recited in claim 7 for use as a differential pressure gauge for measuring pressure of a fluid, said device further comprising:
a chamber in communication with said fluid; and
a diaphragm dividing said chamber,
said array of plates positioned in said chamber on one side of said diaphragm and oriented so as to face said diaphragm.

13. The device as recited in claim 7 for use as a gauge of material consistency, said material having a dielectric constant indicative of its consistency and varying as the consistency of said material varies, said array formed to be convex.

14. The device as recited in claim 13, wherein said array is coated with an anti-stick coating.

* * * * *